United States Patent [19]

Virgulti

[11] Patent Number: 4,759,560
[45] Date of Patent: Jul. 26, 1988

[54] COMPACT PORTABLE REPAIR CART

[76] Inventor: Michael J. Virgulti, 385 Roeloffs Rd., Yardley, Pa. 19067

[21] Appl. No.: 97,596

[22] Filed: Sep. 16, 1987

[51] Int. Cl.$^4$ .................................................. B62B 1/16
[52] U.S. Cl. ............................... 280/47.26; 280/47.33; 280/63; 180/53.8; 312/282; 312/209; 290/1 A; 242/86.2
[58] Field of Search ...................... 280/63, 47.33, 47.26, 280/47.24; 180/53.8; 312/282, 209; 416/55; 242/86.2; 290/1 A, 1 B; 320/2; 248/129

[56] References Cited

U.S. PATENT DOCUMENTS

| 2,177,687 | 10/1939 | Bracken et al. | 290/1 A |
| 2,733,661 | 2/1956 | Surgi | 280/63 |
| 3,734,540 | 5/1973 | Thiermann | 280/63 |

FOREIGN PATENT DOCUMENTS

| 75879 | 4/1983 | European Pat. Off. | 280/47.26 |
| 860838 | 12/1952 | Fed. Rep. of Germany | 312/209 |

Primary Examiner—David M. Mitchell
Assistant Examiner—Tamara L. Finlay
Attorney, Agent, or Firm—Joel F. Spivak

[57] ABSTRACT

A stable, portable utility cart particularly suited for doing "on-site" minor auto repairs has a frame with a pair of wheels on an axle about 1/3 from the rear of the cart and mounted on a lower shelf are batteries and a generator. An upper shelf is adapted to contain at least one tool box. The cart also contains a compressor and a reel and air hose, which may be mounted on a pivotally mounted storage member.

14 Claims, 2 Drawing Sheets

COMPACT PORTABLE REPAIR CART

FIELD OF THE INVENTION

This invention relates to a compact, portable cart particularly adapted to self contain a power source, power tools and accessory items necessary for the performance of specific types of repairs.

BACKGROUND OF THE INVENTION

Presently, due to the requirement in most instances of specific equipment, tools and other items as well as the need of a power supply, many repair jobs cannot be done 'on-site' and must be brought to the repair shop. This causes lost time, inconvenience, reduced productivity and higher costs.

For example, for many minor auto repairs, e.g., repairs relating to upholstery, painting, auto body, glass and mechanical repairs, the car owner must bring the car to the shop. The shop can't perform the repairs until a bay or other space becomes available in the shop. If compact, portable means were available to provide power for tools and carry the tools necessary to perform many repairs outside the shop itself in a convenient manner, productivity can be enhanced and costs thereby reduced.

In addition to uses related to auto repair, a similar apparatus could be used in large facilities, e.g., hospitals, schools and industrial settings where a portable shop which can fit into confined areas would be especially useful.

SUMMARY OF THE INVENTION

A compact, stable, portable cart comprises a frame having front, rear and side members, a bottom shelf and a top shelf, said frame having rolling means mounted thereon rearwardly from the center of the cart, support means extending downwardly from the bottom of the cart forward of the center of the cart for stably supporting the cart on the ground, a handle extending from the front of the cart, at least one rechargeable storage battery mounted on the bottom shelf at rear portion of the cart, a generator coupled to the battery and mounted on the bottom shelf at the front half of the cart for supplying high voltage AC and/or DC power through at least one easily accessible female outlet, a storage section pivotally mounted to the upper portion of the frame and having an upper and lower section extending from the rear of the cart toward the center of the cart above the battery so as to swing upwardly from the rear toward the middle of the cart, and a plurality of storage areas on the top shelf of the cart, at least one of which is adapted to hold a tool box, the various members associated with the cart being mounted in a manner such that the center of gravity of the cart is below the horizontal central axis of the cart and remains somewhat forward of said rolling means but to the rear of the center of the cart.

DETAILED DESCRIPTION OF THE INVENTION

Figure 1:
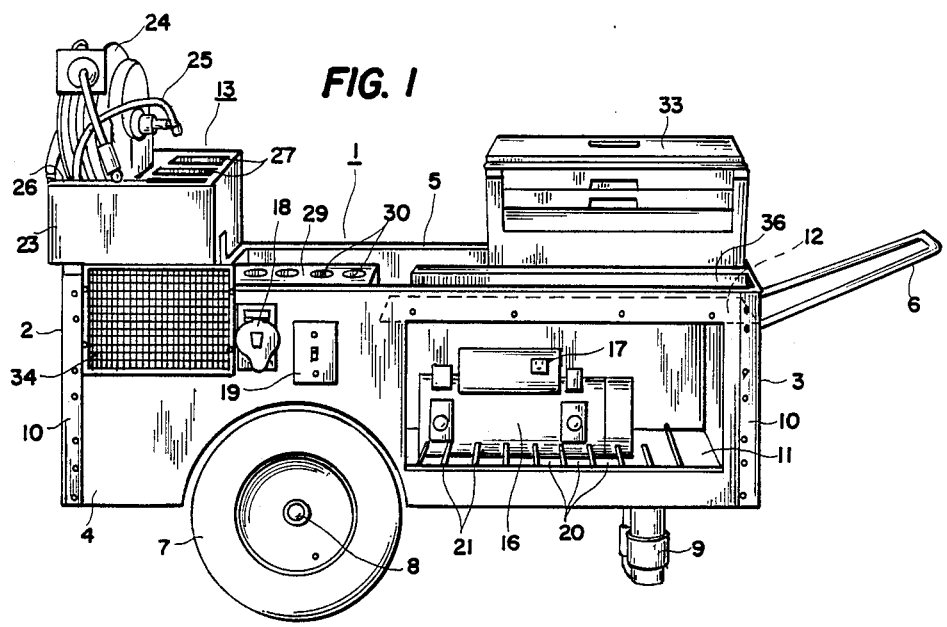
FIG. 1 is a side oblique view of the novel cart in its normal resting position
Figure 2:
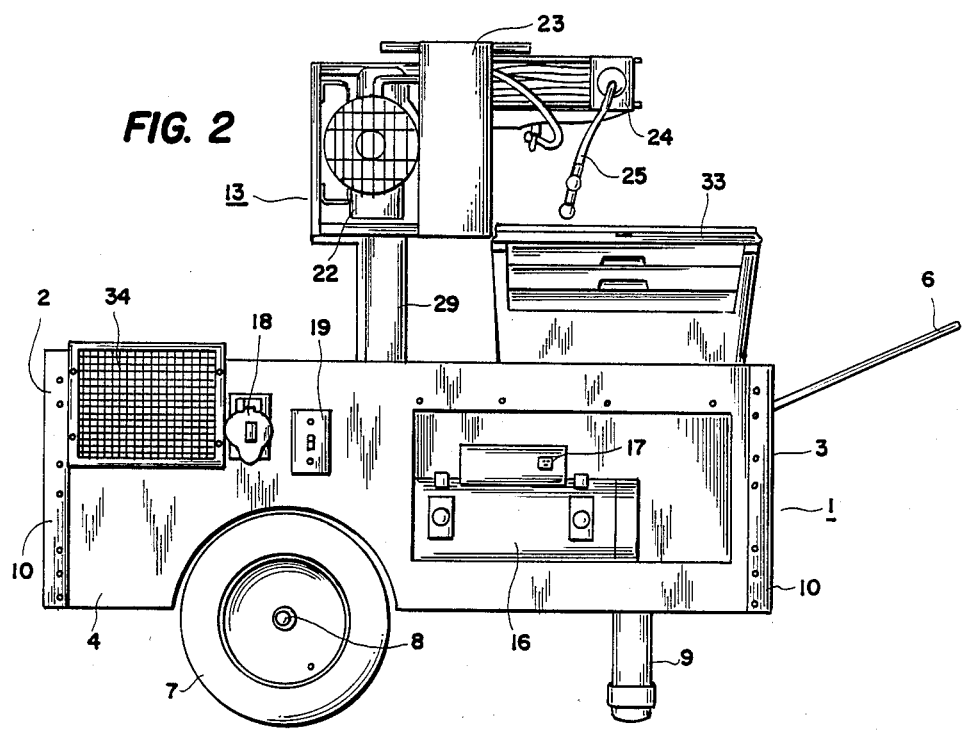
FIG. 2 is a side oblique view of the novel cart with the pivotally mounted shelf in its upward position.
Figure 4:
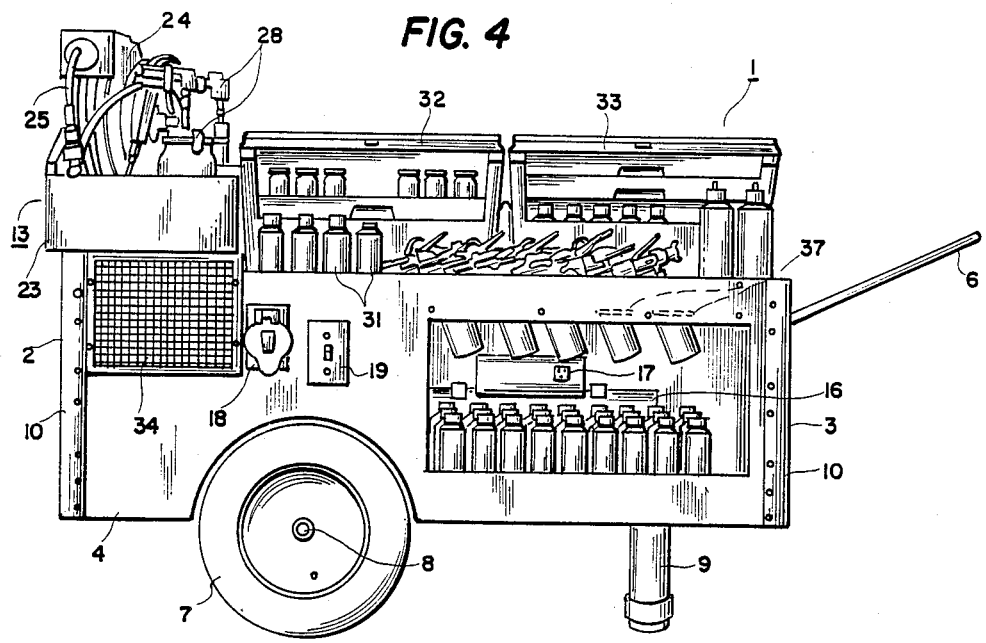
FIG. 4 is an isometric view of the cart showing the cart filled with accessories.
Figure 3:
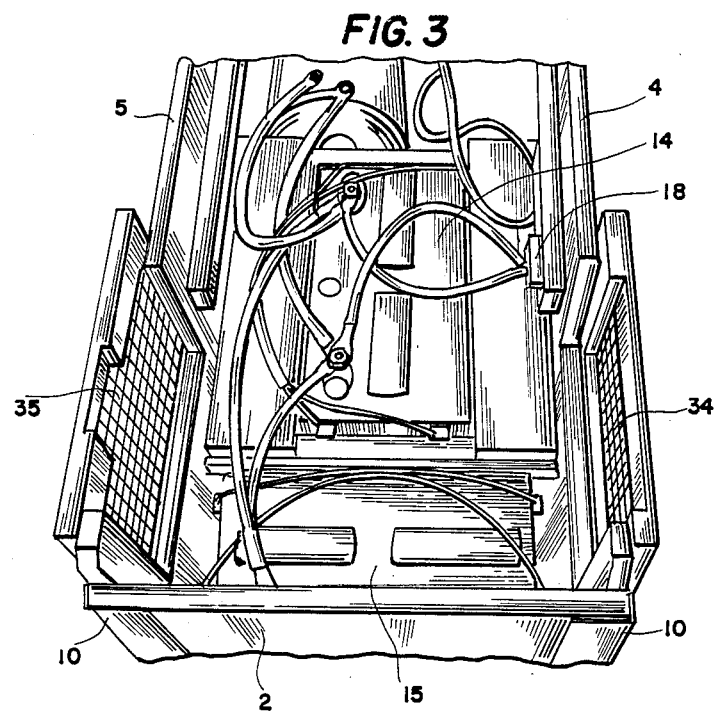
FIG. 3 is a top oblique view of the cart with the pivotally mounted shelf in its upward position to expose the batteries mounted thereunder.

The invention shall be described in terms of a utility cart especially adapted for doing minor repairs to the paint, body, upholstery, etc., of automobiles while parked in a parking area outside or away from a shop facility. It should be understood however, that a similar cart can be adapted for carrying tools, supplies or the like which are adapted to other specific tasks.

Similarly while the cart described herein is of wood construction with metal corner supports, it should be understood that the cart may be all wood, plastic or metal or any combination thereof and the construction materials are not meant to be limiting.

Referring to the Figures, there is shown a cart (1) comprising a frame consisting of a rear member (2), a front member (3) and side members (4) and (5). Mounted to the front member (3) is a handle (6) adapted for lifting and pulling or pushing the cart. The cart is supported on the ground by a pair of large wheels (7) coupled to each other by an axle (8) which is preferably mounted between the middle and rear of the cart, e.g., about ⅓ of the cart length from the rear of the cart, and a front support (9) mounted on and extending downwardly from the bottom portion of the front portion of the cart such that the cart rests level with the ground. The front support (9) is preferable a U-shaped PVC plastic member so as to provide good stability and a firm footing. However, a simple pedestal or a front wheel can also be employed, the latter providing additional maneuverability when needed.

The corners of the frame are preferably supported by means of steel or aluminum corner members (10). The base of the cart (1) is provided with a lower shelf (11) extending across the entire bottom of the cart and above the axle (8) and a front upper shelf (12) which is mounted below the top edge of the frame and extends from the middle of the cart to the front of the cart. Behind the front upper shelf (12) is an upper rear pivotally mounted member (13) which extends from the rear of the cart toward the middle of the cart and pivots about an axis near the middle of the cart so that the rear portion of the member (13) lifts upwardly and forward and exposes the rear of the lower shelf (11) or what is mounted thereon.

Directly over the axle (8) on the lower shelf (11) and in a space provided on the lower shelf (11) to the rear of the axle (8) are mounted a pair of rechargeable storage batteries (14) and (15) such as 12 volt automobile or marine type lead storage batteries or other such power sources. On the front half of the lower shelf (11) and preferably toward side member (5) is mounted an electric generator (16) for converting the low voltage DC power of the batteries (14) and/or (15) to high voltage, e.g., 120 volt, AC or DC power. The generator (16) is preferably provided with at least one female outlet (17) thereon as well as an on-off switch. Also, various other switches and outlets which are coupled to the batteries and/or generator or other equipment may be provided. For example, outdoor-type outlet (18) which is mounted on one side member (4) of the frame is connected across one battery to provide a 12 volt DC accessible external source and a switch (19) is provided adjacent thereto for turning the generator (16) and/or other equipment on and off. The outlet (18) can be used for easy access to a trickle charger for overnight recharging of the storage battery.

As shown, the side member (4) has a large cut-out section which makes access to the generator (16) and outlets (17) thereon readily accessible and also provides access to storage compartments (20) formed by a plurality of spaced parallel slats (21) adjacent the generator (16) on the lower shelf (11).

The pivotally mounted member (13) may be described as having three distinct portions. The first portion is a lower rear shelf on which is mounted a compressor (22) which is operated off the generator (16). The second portion is an upper rear shelf (23) above the generator (16) which rests on the sides (4) and (5) of the frame when in its lowered position, and has mounted thereon a reel (24) containing an air hose (25) wound on the reel (24) and which is coupled to the air output of the compressor (22). The reel (24) is mounted in a rear compartment (26) of the upper rear shelf (23). In front of the reel (24) are several compartments (27) adapted to hold ancillary items such as large compressed air spray bottles and nozzles (28). The third portion (29) which extends forward of the other portions toward the middle of the cart may be provided with additional storage means, e.g., holes (30) along one side thereof which can store bottles (31) containing various fluids. When the member (13) is in its lowered position, the side of the third portion (29) of the member (13) adjacent the side member (5) has its surface coextensive with the surface of the upper shelf (12) such that an area is provided for the storage of one or more tool boxes (32) and (33). The rear of the side members (4) and (5) adjacent where the compressor (22) lies is provided with vented sides (34) and (35) to allow cooling of the compressor (22) and flow of air around the compressor (22) to prevent overheating.

Further, additional accessory storage area is provided on the upper shelf (12) adjacent the tool boxes (32) and (33) by means of compartments (36) and through holes (37) in the shelf (12).

Important to the design of the cart is that the weight of the various items coupled with the cart is such that the center of gravity lies slightly forward of the axle (8), but sufficiently forward of said axle (but) to the rear of the center of the cart) such that removal of tool boxes does not shift the center of gravity to the rear of the axle (8). Also, the items are mounted so as to provide as low a center of gravity as possible without interfering with ease of access to the tools and accessories. In this way, it adds not only to the stability of the cart but the ease in lifting the cart by the handle so as to facilitate moving the cart. For use in a parking area, the cart is preferably 3–4 feet long and 1 to 1.5 feet wide.

Accordingly, the various components of the cart can be moved around. For example, an alternative design of the cart could include the compressor being mounted on the lower forward portion of the shelf of the cart and the hose being mounted in the pivotally mounted member.

Typical equipment for the cart to be used for auto repair, as indicated, includes:

a. A compressor e.g., a ⅛ HP, Intermatic, two stage compressor delivering about 3.2 psi manufactured by Pneumotive Air Power Products, Monroe, LA 71203 which draws relatively low power or a ¾ horsepower Airmate compressor manufactured by Emglo Products Corporation, Johnstown, PA capable of developing 100 psi for operation of air tools but drawing more power than the aforementioned compressor. Preferred for most auto jobs is a lower power compressor which is activated on demand rather than a constant-on type and is no more than about 15" wide. Preferred for most heavy duty air pressure needs is a higher power compressor which is activated on demand.

b. Batteries—two deep cycle, 12 volt, 180 amp-hour marine batteries are preferred.

c. Generator—DC to AC generator rated at about 1600 watts and 15 amps preferably one that is activated on demand when the tool or unit to be operated calls for energy.

d. Reel and retractable reel hose connected to the compressor either with or without a regulator in the line.

e. Spray guns of various sizes, e.g., #15 guns used for touch-up, #2001 one quart cap spray guns and #69 spray guns.

f. Two tool boxes.

g. Paint and dye containers.

What is claimed is:

1. A compact, stable, portable cart comprises a frame, rolling means mounted rearwardly from the center of the cart, support means extending from the bottom of the cart forward of the center of the cart for stably supporting the cart on the ground, a handle extending from the front of the cart, at least one rechargeable storage battery secured at the bottom of the cart, a generator coupled to the battery and secured to the cart for supplying high voltage AC and/or DC power through at least one easily accessible female outlet, a storage section pivotally mounted to the frame extending from the rear of the cart toward the center of the cart so as to swing upwardly from the rear toward the center of the cart, a plurality of storage areas on the top of the cart at least one of which is adapted to hold a tool box, the various members associated with the cart being secured or held on the cart in a manner such that the center of gravity of the cart remains forward of said rolling means.

2. A compact, stable, portable cart comprises a frame having rolling means mounted thereon rearwardly from the center of the cart, support means extending from the bottom of the cart forward of the center of the cart for stability supporting the cart on the ground, a handle extending from the front of the cart, at least one rechargeable power source mounted at the bottom rear portion of the cart, a generator coupled to the power source through a switch and said generator mounted at the bottom front half of the cart for supplying high voltage AC and/or DC power through at least one easily accessible female outlet provided on the cart frame, a storage section pivotally mounted to the frame and having an upper and lower section extending from the rear of the cart toward the center of the cart above the power source so as to swing upwardly from the rear toward the middle of the cart, and a plurality of storage areas on the top of the cart at least one of which is adapted to hold a tool box, the various members associated with the cart being mounted in a manner such that the center of gravity of the cart remains slightly forward of said rolling means.

3. The cart recited in claim 2 wherein said rolling means are a pair of wheels.

4. The cart recited in claim 3 wherein the wheels are coupled to an axle.

5. The cart recited in claim 4 wherein the center of gravity of the cart remains between said axle and the center of the cart.

6. The cart recited in claim 5 wherein the handle is elongated so as to provide a large movement about the axle when lifting the front of the cart by means of said handle.

7. The cart recited in claim 4 wherein two storage batteries are provided, one secured above the axle and the other behind said axle.

8. The cart recited in claim 2 having an air compressor mounted thereon and an air hose mounted on a reel, said reel being mounted to said cart and said air hose being coupled to the output of said compressor and said compressor being coupled to the power source on said cart.

9. The cart recited in claim 8 having said air compressor mounted on the lower section of said pivotally mounted storage section and said air hose mounted on a reel in the upper section of said storage section.

10. The cart recited in claim 9 including storage compartments adapted to hold spray bottles in said upper section of said pivotally mounted storage section in front of said reel.

11. The cart recited in claim 9 including storage compartments adjacent the side of said generator.

12. The cart recited in claim 2 wherein the at least one storage area adapted to hold said tool box is a top shelf which lies below the top edge of said frame such that the side of said cart and the front of the upper section of said pivotally mounted storage section help support said tool box positioned to abut each side and front.

13. The cart recited in claim 12 having a plurality of holes in the top shelf adjacent the area for said tool box, said holes being of a sized adapted for containing various containers or elongated accessories having a top portion too wide to pass through said hole but a bottom portion which does pass through said hole.

14. A compact, stable, portable cart comprising a frame being no more than 1.5 feet in width and no more than 4 feet long, said frame having an axle with a pair of wheels mounted thereon located between the rear and middle of said cart, a bottom shelf mounted to the frame above the axle and extending across the entire area defined by the frame, a top shelf across the front half of the cart mounted below the top edge of said frame, an elongated handle extending from the front of the cart, a front ground support extending downwardly from the bottom of the cart for resting the cart stably on the ground, a storage member pivotally mounted near the top of said cart from about the middle of said cart such that said storage member swings upwardly and forward from the rear of said cart, said storage member comprising a lower rear section, an upper rear section and a front section which becomes coextensive with said top shelf when said storage member is in its lowered position, a pair of heavy storage batteries secured on said bottom shelf, one battery secured such that is lies over said axle and the other battery secured rearwardly of said axle, a generator secured adjacent one side of said bottom shelf forward of said batteries, a front side of said frame being open so as to have easy access to said generator, a compressor mounted on said cart and a reel mounted to said cart, which reel is for an air hose which is coupled to said compressor, said generator being coupled to at least one of said batteries and said compressor being coupled to one of said batteries, a compartment partially formed by a side and front of said frame as well as said front portion of said pivotally mounted storage member and said top shelf and the front of said upper rear section of said storage member adapted to stably support a pair of tool boxes, and a plurality of storage compartments on said top shelf, said bottom shelf and said upper rear section of said pivotally mounted storage member.

* * * * *